(12) United States Patent
Yang et al.

(10) Patent No.: US 10,021,402 B2
(45) Date of Patent: Jul. 10, 2018

(54) ESTIMATION OF VIDEO QUALITY OF EXPERIENCE ON MEDIA SERVERS

(71) Applicant: Dialogic Corporation, Quebec (CA)

(72) Inventors: Kyeong Ho Yang, Freehold, NJ (US); Beril Erkin, Summit, NJ (US); Yisheng Zhao, Edison, NJ (US)

(73) Assignee: Dialogic Corporation, Montreal, Quebec (CA)

( * ) Notice: Subject to any disclaimer, the term of this patent is extended or adjusted under 35 U.S.C. 154(b) by 229 days.

(21) Appl. No.: 14/971,096

(22) Filed: Dec. 16, 2015

(65) Prior Publication Data

US 2017/0180736 A1 Jun. 22, 2017

(51) Int. Cl.
*H04N 19/154* (2014.01)
*H04N 19/164* (2014.01)
*H04N 19/42* (2014.01)

(52) U.S. Cl.
CPC ......... *H04N 19/154* (2014.11); *H04N 19/164* (2014.11); *H04N 19/42* (2014.11)

(58) Field of Classification Search
CPC ..... H04N 19/154; H04N 19/42; H04N 19/164
See application file for complete search history.

(56) References Cited

U.S. PATENT DOCUMENTS

| | | | | |
|---|---|---|---|---|
| 8,554,879 B2 * | 10/2013 | Yu | ........................... | G06F 15/16 709/201 |
| 8,918,535 B2 * | 12/2014 | Ma | ..................... | H04L 29/08099 709/231 |
| 2008/0247460 A1 * | 10/2008 | Kang | ..................... | H04N 19/61 375/240.02 |
| 2009/0003436 A1 * | 1/2009 | Levin | ............. | H04N 21/234309 375/240.02 |
| 2012/0188882 A1 * | 7/2012 | Wilkinson | .......... | H04L 41/5067 370/252 |

(Continued)

OTHER PUBLICATIONS

T. Wiegand, G.J. Sullivan, G. Bjøntegaard, and A. Luthra, "Overview of the H.264/AVC Video Coding Standard", IEEE Transactions on Circuits and Systems for Video Technology, vol. 13, No. 7, Jul. 2003, pp. 560-576.

(Continued)

*Primary Examiner* — Neil Mikeska
(74) *Attorney, Agent, or Firm* — BainwoodHuang

(57) ABSTRACT

Systems and methods of media servers for estimating the video quality of experience (QoE) of human viewers of video content or communications at video receivers. With these systems and methods, a media server can collect, within a plurality of predetermined time windows synchronized in time, operational parameters of ingress and egress networks over which such video content or communications can be transmitted, as well as coding parameters of a video decoder and a video encoder within the media server. Having collected the operational parameters of the ingress network and egress network and the coding parameters of the video decoder and video encoder, the media server can determine QoE scores associated with some or all the ingress network, the video decoder, the video encoder, and the egress network, and estimate a resulting video QoE for a human viewer at a video receiver as a predefined combination of the respective QoE scores.

23 Claims, 4 Drawing Sheets

(56) References Cited

U.S. PATENT DOCUMENTS

| | | | |
|---|---|---|---|
| 2013/0044224 A1* | 2/2013 | Liao | H04N 17/004 348/192 |
| 2014/0357993 A1* | 12/2014 | Hiriyannaiah | A61B 8/565 600/437 |
| 2015/0015722 A1* | 1/2015 | Wildfeuer | H04N 17/004 348/192 |
| 2015/0138373 A1* | 5/2015 | Garcia | H04N 17/004 348/192 |

OTHER PUBLICATIONS

"RTP Payload Format for VP8 Video", http://tools.ieff.org/pdf/draft-ietf-payload-vp8-10.pdf, Oct. 4, 2013.
ITU-T, Recommendation H.265 (04/13), Series H: Audiovisual and Multimedia Systems, Infrastructure of audiovisual services—Coding of Moving Video, High Efficiency Video Coding, Online: http://www.itu.int/rec/T-REC-H.265-201304-I.
HEVC Reference Software, Online: https://hevc.hhi.fraunhofer.de/svn/svn_HEVCSoftware/.
VP9 Video Codec, http://www.webmproject.org/vp9.
Rtp: a Transport Protocol for Real-Time Applications, http://toolsietiorg/pdf/rfc3550.pdf, Jul. 2003.
H. Roodaki, K. Ugur, M. M. Hannuksela, and M. Gabbouj, "Efficient video resolution adaptation using scalable H.265/HEVC," Proc. of IEEE International Conference on Image Processing (ICIP), Sep. 2013.
Wang, Yong, Shih-Fu Chang, and Alexander C. Loui. "Subjective preference of spatio-temporal rate in video adaptation using multi-dimensional scalable coding." Multimedia and Expo, 2004. ICME'04. 2004 IEEE International Conference on. vol. 3. IEEE, 2004.
Jeevan Pokhrel, Bachar Wehbi, Anderson Morals, Ana Cavalli, and Eric Allilaire, "Estimation of QoE of Video Traffic using a Fuzzy Expert System," in Proceedings of the 2013 IEEE Consumer Communications and Networking Conference (CCNC), vol., No., pp. 224-229, Jan. 2013.
Mathias Johanson, Jonas Jalminger, Jukka-Pekka Laulajainen, Kaan Bür, "Audiovisual Network Service Optimization by Quality of Experience Estimation," in Proceedings of the 2012 Networked and Electronic Media Summit, Istanbul, Turkey, pp. 59-64, Oct. 2012.
Extended RTP Profile for Real-Time Transport Control Protocol (RTCP)—Based Feedback (RTP/AVPF), http://tools.ietf.org/pdf/rfc4585.pdf, Jul. 2006.
"Codec Control Messages in the RTP Audio-Visual Profile with Feedback (AVPF)", http://www.rfc-editor.org/rfc/pdfrfc/rfc5104.txt.pdf, Feb. 2008.
"Real Time Control Protocol (RTCP) attribute in Session Description Protocol (SDP)", http://tools.ietf.org/pdf/rfc3605.pdf, Oct. 2003.
"Session Description Protocol", https://tools.ietf.org/html/rfc4566, Jul. 2006.

* cited by examiner

ESTIMATION OF VIDEO QUALITY OF EXPERIENCE ON MEDIA SERVERS

TECHNICAL FIELD

The present application relates generally to systems and methods of video communications, and more specifically to systems and methods of media servers for estimating the video quality of experience (QoE) of human viewers of video content or communications at video receivers.

BACKGROUND

In recent years, video communications and video-based services have gained increased popularity among enterprise and residential customers alike due in no small part to the widespread deployment of broadband communications networks and the numerous advancements made in the field of video compression technology. Such video-based services can include, but are not limited to, video streaming, interactive gaming, Internet protocol television (IPTV), high definition television (HDTV), and video conferencing. In a conventional video communications system, a media server can deliver video content or communications associated with a video-based service to a video receiver (e.g., a video client or server) over at least one wired and/or wireless, public and/or private network (e.g., a portion of the Internet) for viewing by a human viewer. Such video content or communications can be hosted on and/or generated by the media server and/or a third party device (e.g., a video server or client), which can send at least a portion of the video content or communications to the media server over at least one wired and/or wireless, public and/or private network (e.g., another portion of the Internet) for transmission by the media server to the video receiver.

In such a conventional video communications system, a successful transmission of video content or communications from a media server to a video receiver over a communications network generally requires sufficient bandwidth and low latency for minimal packet loss. Such a transmission of video content or communications is typically based on the real-time transport protocol (RTP), and a delivery of such video content or communications by a media server to a video receiver is typically monitored using the real-time transport control protocol (RTCP). For example, a video receiver that receives such video content or communications in the form of RTP packets from a media server can send reception quality feedback information to the media server in the form of RTCP report packets.

Video communications and video-based services can be problematic, however, particularly when transmissions of video content or communications are made over public communications networks such as the Internet. For example, when transmissions of video content or communications are made over the Internet, various video receivers may be subjected to different levels of network congestion, which can result in reduced bandwidth, increased latency, and ultimately increased packet losses, which can severely degrade the video quality of experience (QoE) of human viewers at the video receivers. Moreover, providers of such video-based services often make commitments through service level agreements (SLAs) for meeting certain levels of video QoE for their video customers. However, estimating levels of video QoE for such video customers at a media server can be challenging, particularly when taking into account the effect that public communications networks can have on a resulting video QoE at a video receiver, as well as the processing (e.g., video decoding, video encoding) that can occur within the media server itself prior to delivering the video content or communications to the video receiver.

It would therefore be desirable to have system and methods of media servers for estimating the video QoE of human viewers of video content or communications at video receivers that can avoid at least some of the problems associated with conventional video communications systems and methods.

SUMMARY

In accordance with the present application, systems and methods of media servers are disclosed for estimating the video quality of experience (QoE) of human viewers of video content or communications at video receivers. In the disclosed systems and methods, a media server can collect, within a plurality of predetermined time windows synchronized in time, operational parameters of ingress and egress networks over which such video content or communications can be transmitted, as well as coding parameters of a video decoder and video encoder employed by the media server. Having collected the operational parameters of the ingress network and egress network and the coding parameters of the video decoder and video encoder, the media server can determine QoE scores associated with some or all the ingress network, the video decoder, the video encoder, and the egress network, and estimate a resulting video QoE for a human viewer at a video receiver as a predefined combination of the respective QoE scores.

In a first aspect, a system of a media server for estimating the video QoE of a human viewer of video content or communications at a video receiver includes a video sender (e.g., a video server or client), an ingress network (e.g., a portion of the Internet), a media server, an egress network (e.g., another portion of the Internet), and a video receiver (e.g., a video client or server). The media server can include at least a video decoder, a video encoder, a controller, a QoE data storage, and a plurality of parameter collectors, namely, an ingress network operational parameter collector, an egress network operational parameter collector, a video decoder coding parameter collector, and a video encoder coding parameter collector. The video decoder is operative to receive, from the video sender over the ingress network, an input video stream compressed according to a first coding format, and to decode the input video stream in the first coding format. The video encoder is operative to receive decoded video frames from the video decoder, to encode the decoded video frames according to a second coding format, and to send the encoded video stream in the second coding format over the egress network to the video receiver for viewing by a human user. The plurality of parameter collectors are operative to collect, acquire, or otherwise obtain, under control of the controller and within a first plurality of predetermined time windows synchronized in time (also referred to herein as the "first plurality of synchronized time windows"), operational and/or coding parameters associated with some or all of the ingress network, the video decoder, the video encoder, and the egress network.

In one mode of operation, the ingress network operational parameter collector and the egress network operational parameter collector within the media server are operative to collect, within respective ones of the first plurality of synchronized time windows, operational parameters of the ingress network and the egress network, respectively, including, but not limited to (1) an expected channel bandwidth through the network for providing good quality video, (2) an estimated channel bandwidth through the network, (3) a round trip delay through the network, (4) a channel packet loss ratio in the network, (5) a resultant channel packet loss ratio in the network following one or more requests (e.g., General Negative Acknowledgement (GNACK) messages) for packet retransmissions, (6) a ratio of intra-coded frames (also referred to herein as "I-frames") to total video frames sent over the network, such I-frames being sent in response to one or more requests (e.g., Picture Loss Indication (PLI) messages, Full Intra Request (FIR) messages) to send the I-frames, (7) a numerical indication of how quickly the video sender can send an I-frame in response to a request (e.g., a PLI message, an FIR message) to send the I-frame, and (8) a numerical indication of how well video frames that have undergone error concealment processing are being handled. Having collected the operational parameters of the ingress network and the egress network within the respective ones of the first plurality of synchronized time windows, the ingress and egress network operational parameter collectors can provide the ingress and egress network operational parameters, respectively, to the controller within the media server. The controller can then calculate, generate, obtain, or otherwise determine, for the respective ones of the first plurality of synchronized time windows, (1) a QoE score for the ingress network as a function of the ingress network operational parameters, and (2) an initial QoE score for the egress network as a function of the egress network operational parameters, and store the QoE score for the ingress network and the initial QoE score for the egress network in the QoE data storage.

With regard to this mode of operation, the video decoder coding parameter collector and the video encoder coding parameter collector within the media server are operative to collect, also within respective ones of the first plurality of synchronized time windows, coding parameters of the video decoder and the video encoder, respectively, including, but not limited to (1) a frame rate of the video stream compressed according to the first coding format, (2) a frame size of the video stream compressed according to the first coding format, (3) a frame rate of the video stream compressed according to the second coding format, (4) a frame size of the video stream compressed according to the second coding format, (5) one or more of a quantization step size, a number of bits per macroblock, and a video complexity per macroblock for the video stream compressed according to the first coding format, and (6) one or more of a quantization step size, a number of bits per macroblock, and a video complexity per macroblock for the video stream compressed according to the second coding format. Having collected the coding parameters of the video decoder and the video encoder within the respective ones of the first plurality of synchronized time windows, the video decoder and video encoder coding parameter collectors can provide the video decoder and video encoder coding parameters, respectively, to the controller within the media server. Further, the controller can calculate, generate, obtain, or otherwise determine, for the respective ones of the first plurality of synchronized time windows, (1) a temporal quality score for the video decoder based on the collected frame rate and an expected frame rate of the video stream compressed according to the first coding format, (2) a temporal quality score for the video encoder based on the collected frame rate and an expected frame rate of the video stream compressed according to the second coding format, (3) a spatial quality score for the video decoder based on the collected frame size and an expected frame size of the video stream compressed according to the first coding format, (4) a spatial quality score for the video encoder based on the collected frame size and an expected frame size of the video stream compressed according to the second coding format, (5) a quantization quality score for the video decoder based on one or more of the quantization step size, the number of bits per macroblock, and the video complexity per macroblock for the video stream compressed according to the first coding format, and (6) a quantization quality score for the video encoder based on one or more of the quantization step size, the number of bits per macroblock, and the video complexity per macroblock for the video stream compressed according to the second coding format. The controller can then calculate, generate, obtain, or otherwise determine, for the respective ones of the first plurality of synchronized time windows, (1) an initial QoE score for the video decoder as a function of one or more of the temporal quality score, the spatial quality score, and the quantization quality score for the video decoder, and (2) an initial QoE score for the video encoder as a function of one or more of the temporal quality score, the spatial quality score, and the quantization quality score for the video encoder. The controller can store the initial QoE scores for the video decoder and the video encoder in the QoE data storage.

With further regard to this mode of operation, having determined the QoE score for the ingress network, as well as the initial QoE scores for the egress network, the video decoder, and the video encoder, the controller can calculate, generate, obtain, or otherwise determine, for the first plurality of synchronized time windows, (1) an updated QoE score for the video decoder as a function of the initial QoE score for the video decoder and the QoE score for the ingress network, (2) an updated QoE score for the video encoder as a function of the initial QoE score for the video encoder and the updated QoE score for the video decoder, and (3) an updated QoE score for the egress network as a function of the initial QoE score for the egress network and the updated QoE score for the video encoder. The controller can therefore determine the updated QoE score for the egress network as a first predefined combination of QoE scores corresponding to the ingress network, the video decoder, the video encoder, and the egress network. This first predefined combination of QoE scores represents a resulting video QoE for the human viewer at the video receiver for a first time period corresponding to the first plurality of synchronized time windows.

In likewise fashion, the controller can further calculate, generate, obtain, or otherwise determine one or more additional predefined combinations of QoE scores corresponding to the ingress network, the video decoder, the video encoder, and the egress network for one or more additional contiguous pluralities of synchronized time windows, in which the sum total of (1) the first time period corresponding to the first plurality of synchronized time windows, and (2) one or more additional time periods corresponding to the one or more additional contiguous pluralities of synchronized time windows, represents the total duration of the video content or communications provided at the video receiver for viewing by the human viewer. The controller can then estimate a resulting video QoE for the human viewer for the total duration of the video content or communications at the video receiver as a function of one or more of the average and the standard deviation of the predefined combinations of QoE scores for the first and additional contiguous pluralities of synchronized time windows, and store the estimated resulting video QoE for the human viewer in the QoE data storage.

By providing a media server that can collect, within a plurality of predetermined time windows synchronized in time, at least (1) one or more operational parameters of ingress and egress networks over which video content or communications can be transmitted to a human viewer, and (2) one or more coding parameters of a video decoder and a video encoder employed by the media server, and determine QoE scores associated with some or all the ingress network, the video decoder, the video encoder, and the egress network based at least in part on the collected operational parameters and/or coding parameters, a resulting video QoE for the human viewer at a video receiver can be advantageously estimated by the media server as a predefined combination of the respective QoE scores. Further, in the event it is determined that the estimated resulting video QoE does not meet a target level of video QoE for a particular video-based service, one or more components (e.g., one or more video servers and/or clients, one or more video decoders and/or encoders) of the ingress network, the egress network, and/or the media server can be adjusted, modified, and/or replaced in an effort to achieve the target level of video QoE.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein, and, together with the Detailed Description, explain these embodiments. In the drawings.

DETAILED DESCRIPTION

Systems and methods of media servers are disclosed for estimating the video quality of experience (QoE) of human viewers of video content or communications at video receivers. In the disclosed systems and methods, a media server can collect, within a plurality of predetermined time windows synchronized in time, operational parameters of an ingress network and egress network over which such video content or communications can be transmitted, as well as coding parameters of a video decoder and video encoder employed by the media server. Having collected the operational parameters of the ingress network and egress network and the coding parameters of the video decoder and video encoder, the media server can determine QoE scores associated with some or all the ingress network, the video decoder, the video encoder, and the egress network, and estimate a resulting video QoE for a human viewer at a video receiver as a predefined combination of the respective QoE scores.

Figure 1:
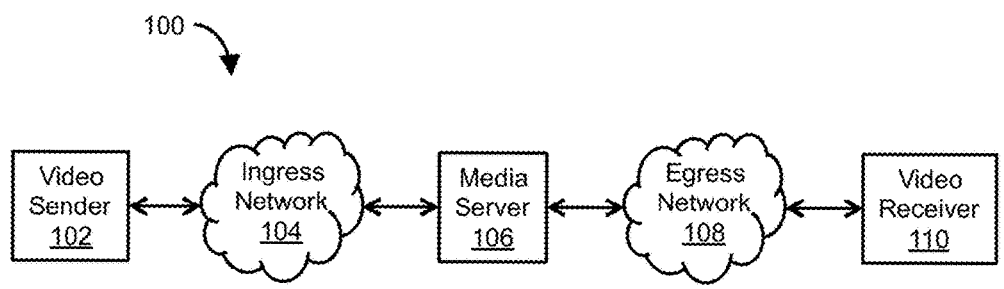
FIG. 1 is a block diagram of an exemplary system for estimating the video quality of experience (QoE) of human viewers of video content or communications at video receivers.

FIG. 1 depicts an illustrative embodiment of an exemplary system 100 of a media server for estimating the video QoE of a human viewer of video content or communications at a video receiver. As shown in FIG. 1, the system 100 includes a video sender 102 (e.g., a video server or client), an ingress network 104 (e.g., a portion of the Internet), a media server 106, an egress network 108 (e.g., another portion of the Internet), and a video receiver 110 (e.g., a video client or server). For example, the media server 106 may be part of a video communications system for delivering video content or communications associated with a video-based service to the video receiver 110 for viewing by a human viewer. Further, such video content or communications may be at least partially hosted on and/or generated by the media server 106 and/or the video sender 102, which may send at least a portion of the video content or communications to the media server 106 over the ingress network 104 for subsequent transmission by the media server 106 over the egress network 108 to the video receiver 110.

Figure 2:
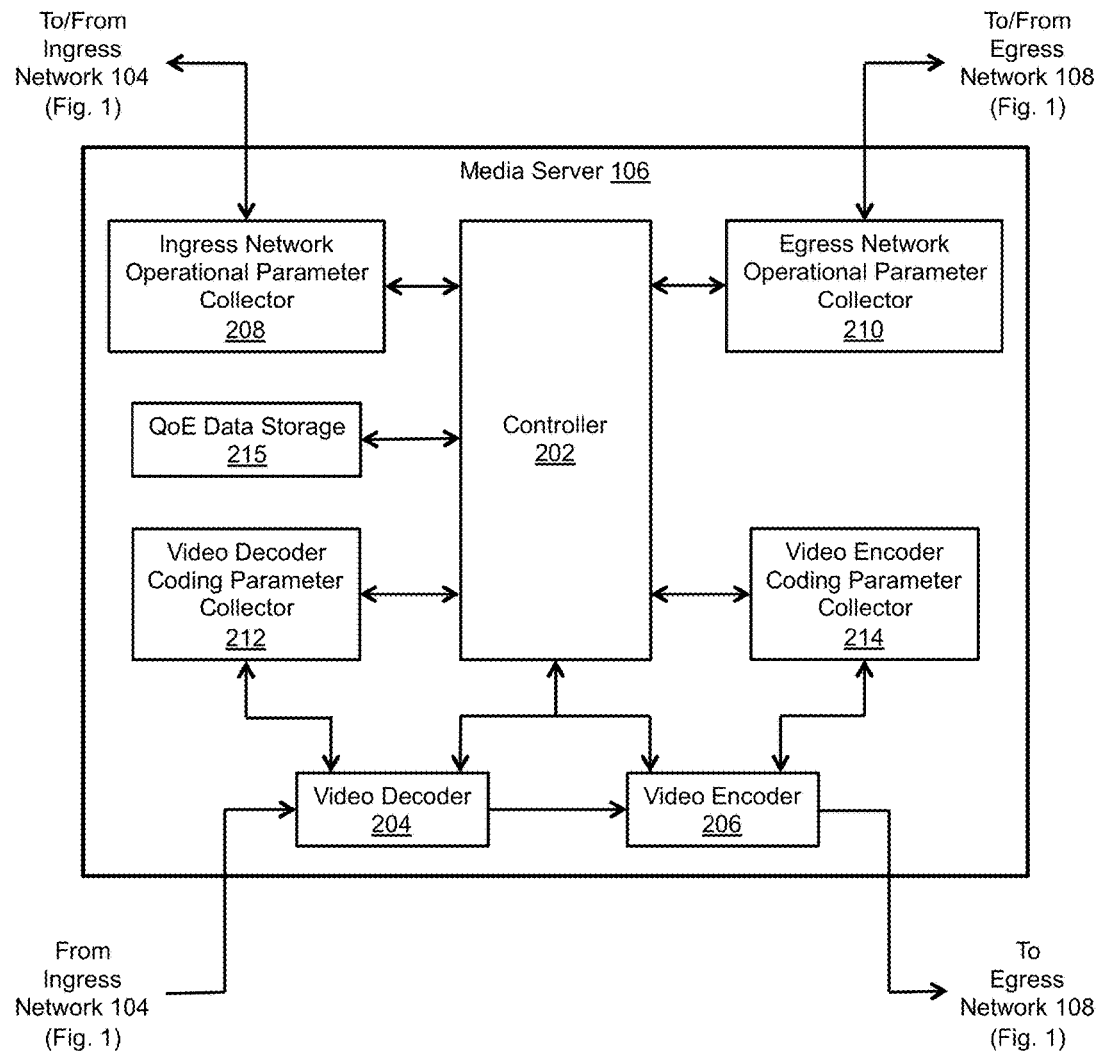
FIG. 2 is a functional block diagram of an exemplary media server included in the system of FIG. 1, in accordance with the present application.

FIG. 2 depicts an illustrative embodiment of the media server 106 included in the system 100 of FIG. 1, in accordance with the present application. As shown in FIG. 2, the media server 106 includes a video decoder 204, a video encoder 206, a controller 202, a QoE data storage 215, and a plurality of parameter collectors, namely, an ingress network operational parameter collector 208, an egress network operational parameter collector 210, a video decoder coding parameter collector 212, and a video encoder coding parameter collector 214. Within the media server 106 of FIG. 2, the video decoder 204 is operative to receive, from the video sender 102 over the ingress network 104, an input video stream compressed according to a first coding format, and to decode the input video stream in the first coding format. The video encoder 206 is operative to receive decoded video frames from the video decoder 204, to encode the decoded video frames according to a second coding format, and to send the encoded video stream in the second coding format over the egress network 108 to the video receiver 110 for viewing by the human user. The plurality of parameter collectors 208, 210, 212, 214 are operative to collect, acquire, or otherwise obtain, under control of the controller 202 and within a plurality of predetermined time windows synchronized in time (also referred to herein as the "plurality of synchronized time windows"), operational and/or coding parameters associated with some or all of the ingress network 104, the video decoder 204, the video encoder 206, and the egress network 108. The plurality of parameter collectors 208, 210, 212, 214 are further operative to cease collecting, under control of the controller 202, such operational and/or coding parameters once a time period for a respective synchronized time window has elapsed, as well as when an external application requests the media server 106 to provide an estimated resulting video QoE for the human viewer at the video receiver 110, or one or more coding parameters (e.g., a target bitrate, a frame rate, a frame size) have changed. In one embodiment, the media server 106 can provide a no-reference estimation of video QoE for the human viewer at the video receiver 110.

Figure 3:
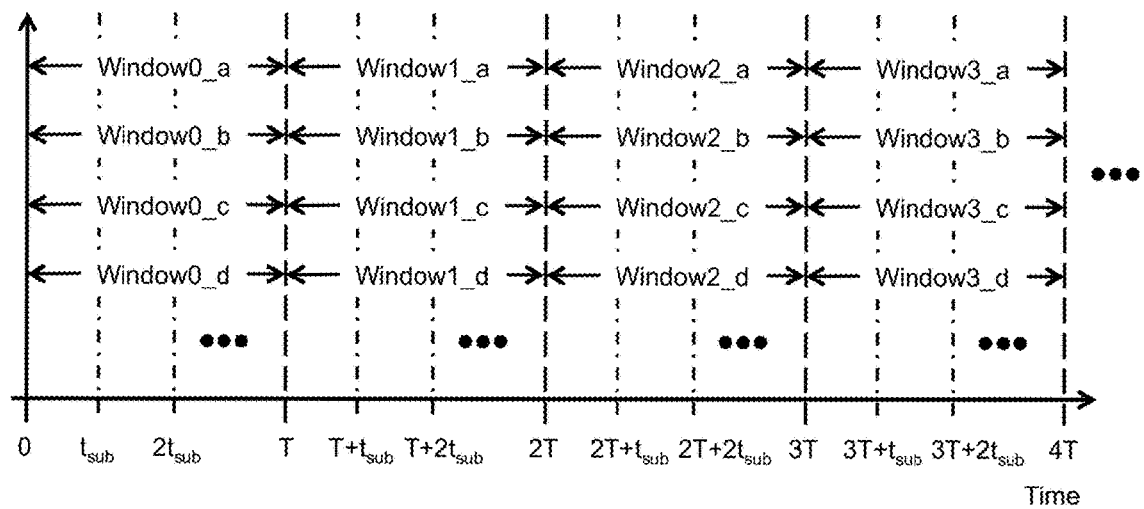
FIG. 3 is a timing diagram of multiple contiguous pluralities of synchronized time windows for use in estimating the video QoE of human viewers of video content or communications at video receivers, using the media server of FIG. 2.

In an exemplary mode of operation, the ingress network operational parameter collector 208 and the egress network operational parameter collector 210 included in the media server 106 are operative to collect, within respective ones of the plurality of synchronized time windows, operational parameters of the ingress network 104 and the egress network 108, respectively. Further, the video decoder coding parameter collector 212 and the video encoder coding parameter collector 214 included in the media server 106 are operative to collect, also within respective ones of the plurality of synchronized time windows, coding parameters of the video decoder 204 and the video encoder 206, respectively. Such a plurality of synchronized time windows are illustrated in FIG. 3, which depicts a plurality of synchronized time windows, Window0_a, Window0_b, Window0_c, and Window0_d, within a time period that extends from time "0" to time "T." In one embodiment, the time, T, can be set to 5 seconds or any other suitable value. For example, the ingress network operational parameter collector 208 may collect operational parameters of the ingress network 104 within the time window, Window0_a, and the egress network operational parameter collector 210 may collect operational parameters of the egress network 108 within the time window, Window0_b. Further, the video decoder coding parameter collector 212 may collect coding parameters of the video decoder 204 within the time window, Window0_c, and the video encoder coding parameter collector 214 may collect coding parameters of the video encoder 206 within the time window, Window0_d.

In one embodiment, the ingress network operational parameter collector 208 (see FIG. 2) and the egress network operational parameter collector 210 (see FIG. 2) are operative to collect, within the time windows, Window0_a and Window0_b (see FIG. 3), respectively, operational parameters of the ingress and egress networks 104, 108 (see FIG. 1), including, but not limited to (1) an expected channel bandwidth, $BW_{exp}$, through the respective network for providing good quality video, (2) an estimated channel bandwidth, $BW_{ch}$, through the respective network, (3) a round trip delay, $D_{round\_trip}$, through the respective network, (4) a channel packet loss ratio, $PL_{ratio}$, in the respective network, (5) a resultant channel packet loss ratio, $PL_{ratio\_resultant}$, in the respective network following one or more requests (e.g., General Negative Acknowledgement (GNACK) messages) for packet retransmissions (typically, $PL_{ratio\_resultant} \leq PL_{ratio}$), (6) a ratio of intra-coded frames (also referred to herein as "I-frames") to total video frames, $N_{extra\_IFrame\_ratio}$, sent over the respective network, such I-frames being sent in response to one or more requests (e.g., Picture Loss Indication (PLI) messages, Full Intra Request (FIR) messages) to send the I-frames, (7) a first numerical indication, $W_{I\text{-}frame\_response}$, of how quickly the video sender 102 can send an I-frame following one or more requests (e.g., PLI messages, FIR messages) to send the I-frame, and/or (8) a second numerical indication, $W_{error\_concealment}$, of how well video frames that have undergone error concealment processing are being handled. In one embodiment, the first numerical indication can range from 0.5 to 1.0 or any other suitable values, with smaller numerical values being indicative of the video sender 102 promptly sending I-frames upon request. In one embodiment, the second numerical indication can likewise range from 0.5 to 1.0 or any other suitable values, with smaller numerical values being indicative of better handling (e.g., better concealment of packet losses) of video frames.

For example, the media server 106 may determine the network operational parameter, $BW_{exp}$ (the expected channel bandwidth), using the Session Description Protocol (SDP) for capability negotiation during session initialization with the video sender 102, as well as during session initialization with the video receiver 110. Further, with respect to the ingress network 104, the media server 106 may determine the network operational parameter, $N_{extra\_IFrame\_ratio}$ (the ratio of I-frames to total video frames), by counting the number of I-frames it receives within a predetermined time, τ, after having sent one or more PLI messages to the video sender 102. For example, such a predetermined time, τ, may be determined, as follows:

$$\tau = \alpha + \beta * D_{round\_trip} \text{ (milliseconds),} \quad (1)$$

in which "α" and "β" are constants, and "$D_{round\_trip}$" is the round trip delay through the ingress network 104. In one embodiment, the constant, α, can be set to 200 or any other suitable value, and the constant, β, can be set to 1.1 or any other suitable value. With respect to the egress network 108, the media server 106 may determine the network operational parameter, $N_{extra\_IFrame\_ratio}$, by counting the number of I-frames it generates in response to one or more PLI messages received from the video receiver 110.

It is noted that the ingress network operational parameter collector 208 (see FIG. 2) can collect some or all of such operational parameters of the ingress network 104 (see FIG. 1), in accordance with processes disclosed in U.S. patent application Ser. No. 14/186,239 filed Feb. 21, 2014 entitled EFFICIENT PACKET PROCESSING AT VIDEO RECEIVER IN MULTIMEDIA COMMUNICATIONS OVER PACKET NETWORKS, the disclosure of which is hereby incorporated herein by reference in its entirety. The ingress network operational parameter collector 208 can further collect, as desired and/or required, one or more of such operational parameters of the ingress network 104 while taking into account prior knowledge pertaining to the video sender 102 (see FIG. 1), including, but not limited to, certain costs associated with sending specific forms of packet error feedback information over the ingress network 104 to the video sender 102, as well as wait times for handling out-of-order packets and/or receiving retransmissions of lost packets over the ingress network 104 from the video sender 102, some or all of which can have an impact on the bandwidth and/or latency of the ingress network 104.

It is further noted that the egress network operational parameter collector 210 (see FIG. 2) can collect some or all of such operational parameters of the egress network 108 (see FIG. 1), in accordance with processes disclosed in U.S. patent application Ser. No. 14/186,205 filed Feb. 21, 2014 entitled EFFICIENT BITRATE ADAPTATION IN VIDEO COMMUNICATIONS OVER IP NETWORKS, the disclosure of which is also hereby incorporated herein by reference in its entirety. The egress network operational parameter collector 210 can further collect, as desired and/or required, one or more of such operational parameters of the egress network 108 while taking into account prior knowledge pertaining to the video receiver 110 (see FIG. 1), including, but not limited to, reception quality feedback information received at the media server 106 from the video receiver 110 over the egress network 108, and/or information about multimedia data transmit rates from the media server 106 to the data receiver 110 over the egress network 108, some or all of which can be used at least to determine an expected, estimated, and/or available bandwidth through the egress network 108.

Having collected the operational parameters of the ingress network 104 (see FIG. 1) and the operational parameters of the egress network 108 (see FIG. 1) within the synchronized time windows, Window0_a and Window0_b (see FIG. 3), respectively, the ingress and egress network operational parameter collectors 208, 210 (see FIG. 2) can provide the respective network operational parameters to the controller 202 (see FIG. 2). The controller 202 can then determine (1) for the time window, Window0_a, a QoE score for the ingress network 104 as a function of one or more of the collected ingress network operational parameters, and (2)

for the time window, Window0_b, an initial QoE score for the egress network 108 as a function of one or more of the collected egress network operational parameters, and store the QoE score for the ingress network 104 and the initial QoE score for the egress network 108 in the QoE data storage 215. For example, such a QoE score for each of the ingress and egress networks 104, 108 can be expressed, as follows:

$$S_{network}=f(BW_{exp},BW_{ch},D_{round\_trip},PL_{ratio},\\PL_{ratio\_resultant},N_{extra\_IFrame\_raio},W_{I\text{-}frame\_response},\\W_{error\_concealment}), \quad (2)$$

in which "f( . . . )" is a predetermined function of the operational parameters (i.e., $BW_{exp}$, $BW_{ch}$, $D_{round\_trip}$, $PL_{ratio}$, $PL_{ratio\_resultant}$, $N_{extra\_IFrame\_raio}$, $W_{I\text{-}frame\_response}$, $W_{error\_concealment}$) of the ingress network 104 or the egress network 108, as appropriate. In one embodiment, the predetermined function, f( . . . ), can be expressed, as follows:

$$f( \ldots )=a*BW_{ch}/BW_{exp}+b*(1-PL_{ratio})+c*\\PL_{ratio\_resultant}*W_{error\_concealment}+\\d*N_{extra\_IFrame\_ratio}*W_{I\text{-}frame\_response}, \quad (3)$$

in which "a," "b," "c," and "d" are constants. In one embodiment, the constant, a, can be set to 60 or any other suitable value; the constant, b, can be set to 40 or any other suitable value; the constant, c, can be set to −500 or any other suitable value; and, the constant, d, can be set to −100 or any other suitable value.

With regard to this exemplary mode of operation, the video decoder coding parameter collector 212 (see FIG. 2) and the video encoder coding parameter collector 214 (see FIG. 2) are operative to collect, within the synchronized time windows, Window0_c and Window0_d (see FIG. 3), respectively, coding parameters of the video decoder and video encoder 204, 206 (see FIG. 2), including, but not limited to (1) a frame rate of the video stream compressed according to the first coding format, (2) a frame size of the video stream compressed according to the first coding format, (3) a frame rate of the video stream compressed according to the second coding format, (4) a frame size of the video stream compressed according to the second coding format, (5) one or more of a quantization step size used in a quantization process, a number of bits per macroblock, and a video complexity per macroblock for the video stream compressed according to the first coding format, and (6) one or more of a quantization step size used in the quantization process, a number of bits per macroblock, and a video complexity per macroblock for the video stream compressed according to the second coding format.

Having collected the coding parameters of the video decoder 204 and the video encoder 206 within the synchronized time windows, Window0_c and Window0_d, the video decoder and video encoder coding parameter collectors 212, 214 can provide the video decoder and video encoder coding parameters, respectively, to the controller 202 (see FIG. 2). Further, the controller 202 can determine (1) for the time window, Window0_c, a temporal quality score, $S_{temporal}$ (decoder), for the video decoder 204 based on the collected frame rate and an expected frame rate of the video stream compressed according to the first coding format, (2) for the time window, Window0_d, a temporal quality score, $S_{temporal}$ (encoder), for the video encoder 206 based on the collected frame rate and an expected frame rate of the video stream compressed according to the second coding format, (3) for the time window, Window0_c, a spatial quality score, $S_{spatial}$ (decoder), for the video decoder 204 based on the collected frame size and an expected frame size of the video stream compressed according to the first coding format, (4) for the time window, Window0_d, a spatial quality score, $S_{spatial}$ (encoder), for the video encoder 206 based on the collected frame size and an expected frame size of the video stream compressed according to the second coding format, (5) for the time window, Window0_c, a quantization quality score, $S_{quantization}$ (decoder), for the video decoder 204 based on one or more of the quantization step size, the number of bits per macroblock, and the video complexity per macroblock for the video stream compressed according to the first coding format, and (6) for the time window, Window0_d, a quantization quality score, $S_{quantization}$ (encoder), for the video encoder 206 based on one or more of the quantization step size, the number of bits per macroblock, and the video complexity per macroblock for the video stream compressed according to the second coding format.

The temporal quality scores, $S_{temporal}$ (decoder) and $S_{temporal}$ (encoder), can provide indications of the smoothness of motion in the respective video streams handled by the video decoder 204 and the video encoder 206, respectively. In order to increase the accuracy of the frame rate information used by the controller 202 to determine the temporal quality scores, $S_{temporal}$ (decoder) and $S_{temporal}$ (encoder), the video decoder and video encoder coding parameter collectors 212, 214 can collect the frame rate information within a plurality of sub-windows of the synchronized time windows, Window0_c and Window0_d. Such a plurality of sub-windows are illustrated in FIG. 3, which depicts a first sub-window that extends from time, 0, to time "$t_{sub}$," a second sub-window that extends from time, $t_{sub}$, to time "$2t_{sub}$," and so on, for the time period (i.e., from time, 0, to time, T; see FIG. 3) of the Window0_c and Window0_d. In one embodiment, the time, $t_{sub}$, can be set to 500 milliseconds or any other suitable value. For example, the controller 202 may determine the temporal quality scores, $S_{temporal}$ (decoder) and $S_{temporal}$ (encoder), using a lookup table based on the expected frame rate of a respective video stream, and the collected frame rate information for the plurality of sub-windows of the synchronized time windows, Window0_c and Window0_d. Further, the controller 202 may determine the expected frame rate of the respective video stream using the Session Description Protocol (SDP) for capability negotiation, during session initialization with the video sender 102 and the video receiver 110.

The temporal quality score, $S_{temporal}$, for each of the video decoder and video encoder 204, 206 can be expressed, as follows:

$$S_{temporal}=g(S_{FR\_avg},S_{FR\_dev}), \quad (4)$$

in which "$S_{FR\_avg}$" is the average of the temporal quality scores, $S_{temporal}$ (decoder/encoder), for the first sub-window extending from time, 0, to time, $t_{sub}$, the second sub-window extending from time, $t_{sub}$, to time, $2t_{sub}$, and so on, within the time period (i.e., from time, 0, to time, T; see FIG. 3) of the time window, Window0_c or Window0_d, as appropriate; "$S_{FR\_dev}$" is the standard deviation of the temporal quality scores, $S_{temporal}$ (decoder/encoder), for the first sub-window extending from time, 0, to time, $t_{sub}$, the second sub-window extending from time, $t_{sub}$, to time $2t_{sub}$, and so on, within the time period (i.e., from time, 0, to time, T; see FIG. 3) of the time window, Window0_c or Window0_d, as appropriate; and, "g( . . . )" is a predetermined function of $S_{FR\_avg}$ and $S_{FR\_dev}$. In one embodiment, the predetermined function, g( . . . ), can be expressed, as follows:

$$g( \ldots )=S_{FR\_avg}-\gamma*S_{FR\_dev}, \quad (5)$$

in which "γ" is a constant. In one embodiment, the constant, γ, can be set to 1.5 or any other suitable value.

The spatial quality scores, $S_{spatial}$ (decoder) and $S_{spatial}$ (encoder), can provide indications of the resolution of the respective video streams handled by the video decoder 204 and the video encoder 206, respectively. For example, the controller 202 may determine the spatial quality scores, $S_{spatial}$ (decoder) and $S_{spatial}$ (encoder), using a lookup table based on the expected frame size in the number of macroblocks of a respective video stream, and the collected frame size information for the synchronized time windows, Window0_$c$ and Window0_$d$. The spatial quality score, $S_{spatial}$, for each of the video decoder and video encoder 204, 206 can be expressed, as follows:

$$S_{spatial} = h(FS, FS_{exp}), \quad (6)$$

in which "FS" corresponds to the collected frame size information for the time window, Window0_$c$ or Window0_$d$, as appropriate; "$FS_{exp}$" corresponds to the expected frame size in the number of macroblocks of the respective video stream, as appropriate; and "h( . . . )" is a predetermined function of FS and $FS_{exp}$. In one embodiment, the predetermined function, h( . . . ), can be expressed, as follows:

$$h(\ldots) = 100 + \delta * \log(FS/FS_{exp}), \quad (7)$$

in which "δ" is a constant. In one embodiment, the constant, δ, can be set to 60 or any other suitable value.

The quantization quality scores, $S_{quantization}$ (decoder) and $S_{quantization}$ (encoder), can provide indications of how finely pixels of the respective video streams handled by the video decoder 204 and the video encoder 206 have been represented in the quantization process. For example, the controller 202 may determine the quantization quality scores, $S_{quantization}$ (decoder) and $S_{quantization}$ (encoder), using a lookup table based on the quantization step size, the number of bits per macroblock, and the video complexity per macroblock for a respective video stream for the synchronized time windows, Window0_$c$ and Window0_$d$. The quantization quality score, $S_{quantization}$, for each of the video decoder and video encoder 204, 206 can be expressed, as follows:

$$S_{quantization} = k(Q_{step}, B_{MB}, C_{MB}), \quad (8)$$

in which "$Q_{step}$" corresponds to the quantization step size; "$B_{MB}$" corresponds to the number of bits per macroblock; "$C_{MB}$" corresponds to the video complexity per macroblock; and, "k( . . . )" is a predetermined function of $Q_{step}$, $B_{MB}$, and $C_{MB}$. In one embodiment, the predetermined function, k( . . . ), can be expressed, as follows:

$$k(\ldots) = \epsilon * 1.0/\text{bound}(Q_{step}, 1, 16) + \omega * \text{sqrt}(B_{MB}/C_{MB}), \quad (9)$$

in which "ϵ" and "ω" are constants, and "bound($Q_{step}$, 1, 16)" is operative to bound $Q_{step}$ by 1 to 16. In one embodiment, the constant, ϵ, can be set to 80 or any other suitable value, and the constant, ω, can be set to 20 or any other suitable value.

With further regard to this exemplary mode of operation, the controller 202 can determine, for the synchronized time windows, Window0_$c$ and Window0_$d$, an initial QoE score for the video decoder 204 and an initial QoE score for the video encoder 206, as a function of one or more of the temporal quality score, $S_{temporal}$ (decoder/encoder), the spatial quality score, $S_{spatial}$ (decoder/encoder), and the quantization quality score, $S_{quantization}$ (decoder/encoder), and store the initial QoE scores for the video decoder 204 and the video encoder 206 in the QoE data storage 215. The initial QoE score for each of the video decoder and video encoder 204, 206 can be expressed, as follows:

$$S_{decoder/encoder} = l(S_{temporal}, S_{spatial}, S_{quantization}), \quad (10)$$

in which "l( . . . )" is a predetermined function of $S_{temporal}$, $S_{spatial}$, and $S_{quantization}$ for the video decoder 204 or the video encoder 206, as appropriate. In one embodiment, the predetermined function, l( . . . ), can be expressed, as follows:

$$l(\ldots) = \mu * S_{temporal} + \rho * S_{spatial} + \lambda * S_{quantization}, \quad (11)$$

in which "μ", "ρ," and "λ" are constants. In one embodiment, the constant, μ, can be set to 0.25 or any other suitable value; the constant, ρ, can be set to 0.25 or any other suitable value; and, the constant, λ, can be set to 0.5 or any other suitable value.

Having determined the QoE score for the ingress network 104, as well as the respective initial QoE scores for the egress network 108, the video decoder 204, and the video encoder 206, the controller 202 within the media server 106 can determine for the time window, Window0_$c$, an updated QoE score for the video decoder 204 as a function of the initial QoE score for the video decoder 204 and the QoE score for the ingress network 104. The updated QoE score for the video decoder 204 can be expressed, as follows:

$$\hat{S}_{decoder} = p(S_{decoder}, S_{network}(\text{ingress})), \quad (12)$$

in which "$S_{decoder}$" corresponds to the initial QoE score for the video decoder 204; "$S_{network}$(ingress)" corresponds to the QoE score for the ingress network 104; and, "p( . . . )" is a predetermined function of $S_{decoder}$ and $S_{network}$(ingress). In one embodiment, the predetermined function, p( . . . ), can be expressed, as follows:

$$p(\ldots) = \Sigma * S_{decoder} + (1-\sigma) * S_{network\_ingress}, \quad (13)$$

in which "σ" is a constant. In one embodiment, the constant, σ, can be set to 0.75 or any other suitable value.

The controller 202 can further determine, for the time window, Window0_$d$, an updated QoE score for the video encoder 206 as a function of the initial QoE score for the video encoder 206 and the updated QoE score for the video decoder 204 ($\hat{S}_{decoder}$; see equation (12)). The updated QoE score for the video encoder 206 can be expressed, as follows:

$$\hat{S}_{encoder} = q(S_{encoder}, \hat{S}_{decoder}), \quad (14)$$

in which "$S_{encoder}$" corresponds to the initial QoE score for the video encoder 206; "$\hat{S}_{decoder}$" corresponds to the updated QoE score for the video decoder 204; and, "q( . . . )" is a predetermined function of $S_{encoder}$ and $\hat{S}_{decoder}$. In one embodiment, the predetermined function, q( . . . ), can be expressed, as follows:

$$q(\ldots) = \varphi * \min(S_{encoder}, \hat{S}_{decoder}) + (1-\varphi) * \max(S_{encoder}, \hat{S}_{decoder}), \quad (15)$$

in which "φ" is a constant. In one embodiment, the constant, φ, can be set to 0.75 or any other suitable value.

The controller 202 can still further determine, for the time window, Window0_$b$, an updated QoE score for the egress network 108 as a function of the initial QoE score for the egress network 108 and the updated QoE score for the video encoder 206 ($\hat{S}_{encoder}$; see equation (14)). It is noted that the updated QoE score for the egress network 108 represents a resulting video QoE (also referred to herein as "$S_{QoE}$"; see equation (16)) for the human viewer at the video receiver 110 for the time period (i.e., from time, 0, to time, T; see FIG. 3) corresponding to the plurality of synchronized time windows, Window0_$a$, Window0_$b$, Window0_$c$, and Window0_d. The resulting video QoE, $S_{QoE}$, for the human viewer at the video receiver 110 for the time period corresponding to the plurality of synchronized time windows, Window0_a, Window0_b, Window0_c, and Window0_d can be expressed, as follows:

$$S_{QoE} = y(\hat{S}_{encoder}, S_{network}(egress)), \quad (16)$$

in which "$\hat{S}_{encoder}$" corresponds to the updated QoE score for the video encoder 206 (see equation (14)), "$S_{network}(egress)$" corresponds to the initial QoE score for the egress network 108; and, "$y(\ldots)$" is a predetermined function of $\hat{S}_{encoder}$ and $S_{network}(egress)$. In one embodiment, the predetermined function, $y(\ldots)$, can be expressed, as follows:

$$y(\ldots) = \eta * \min(\hat{S}_{encoder}, S_{network\_eggress}) + (1-\eta) * \max(\hat{S}_{encoder}, S_{network\_eggress}), \quad (17)$$

in which "$\eta$" is a constant. In one embodiment, the constant, $\eta$, can be set to 0.75 or any other suitable value. The controller 202 can therefore determine, for the plurality of synchronized time windows, Window0_a, Window0_b, Window0_c, and Window0_d, the resulting video QoE, $S_{QoE}$ (see equation (16)), for the human viewer at the video receiver 110 as a first predefined combination of QoE scores corresponding to the ingress network 104, the video decoder 204, the video encoder 206, and the egress network 108.

In likewise fashion, the controller 202 can determine, for one or more additional contiguous pluralities of synchronized time windows, one or more additional resulting video QoEs (each such additional resulting video QoE also referred to herein as "$S_{QoE}$;" see equation (16)) for the human viewer at the video receiver 110 as one or more additional predefined combinations of QoE scores corresponding to the ingress network 104, the video decoder 204, the video encoder 206, and the egress network 108. Such additional contiguous pluralities of synchronized time windows are depicted in FIG. 3 as a plurality of synchronized time windows, Window1_a, Window1_b, Window1_c, and Window1_d within a time period that extends from time, T, to time "2T," a plurality of synchronized time windows, Window2_a, Window2_b, Window2_c, and Window2_d within a time period that extends from time, 2T, to time "3T," a plurality of synchronized time windows, Window3_a, Window3_b, Window3_c, and Window3_d within a time period that extends from time, 3T, to time "4T," and so on, for the total duration of the video content or communications provided by the media server 106 to the video receiver 110 for viewing by the human viewer.

It is noted that FIG. 3 further depicts a plurality of sub-windows within each of the time periods extending from time, T, to time, 2T, from time, 2T, to time, 3T, from time, 3T, to time, 4T, and so on, for the duration of the respective time periods, for use in determining the temporal quality score, $S_{temporal}$ (see equation (4)), for each of the video decoder 204 and the video encoder 206 within these respective time periods. Within the time period of the plurality of synchronized time windows, Window1_a, Window1_b, Window1_c, and Window1_d, extending from time, T, to time, 2T, FIG. 3 depicts a first sub-window that extends from time, T, to time "T+$t_{sub}$," a second sub-window that extends from time, T+$t_{sub}$, to time "T+2$t_{sub}$," and so on, for the duration of the respective time period. Within the time period of the plurality of synchronized time windows, Window2_a, Window2_b, Window2_c, and Window2_d, extending from time, 2T, to time, 3T, FIG. 3 further depicts a first sub-window that extends from time, 2T, to time "2T+$t_{sub}$," a second sub-window that extends from time, 2T+$t_{sub}$, to time "2T+2$t_{sub}$," and so on, for the duration of the respective time period. Within the time period of the plurality of synchronized time windows, Window3_a, Window3_b, Window3_c, and Window3_d, extending from time, 3T, to time, 4T, FIG. 3 still further depicts a first sub-window that extends from time, 3T, to time "3T+$t_{sub}$," a second sub-window that extends from time, 3T+$t_{sub}$, to time "3T+2$t_{sub}$," and so on, for the duration of the respective time period.

In this exemplary mode of operation, the sum total of at least (1) the time period extending from time, 0, to time, T, corresponding to the synchronized time windows, Window0_a, Window0_b, Window0_c, and Window0_d, (2) the time period extending from time, T, to time, 2T, corresponding to the synchronized time windows, Window1_a, Window1_b, Window1_c, and Window1_d, (3) the time period extending from time, 2T, to time, 3T, corresponding to the synchronized time windows, Window2_a, Window2_b, Window2_c, and Window2_d, and (4) the time period extending from time, 3T, to time, 4T, corresponding to the synchronized time windows, Window3_a, Window3_b, Window3_c, and Window3_d, can represent the total duration of the video content or communications provided by the media server 106 to the video receiver 110 for viewing by the human viewer. The controller 202 can estimate a resulting video QoE for the human viewer for the total duration (such a resulting video QoE for the total duration also referred to herein as "$S_{QoE\_total}$"; see equation (18)), extending at least from time, 0, to time, 4T (see FIG. 3), of the video content or communications at the video receiver 110 as a function of one or more of the average and the standard deviation of the predefined combinations of QoE scores (each predefined combination of QoE scores referred to herein as "$S_{QoE}$" (see equation (16))) for the plurality of synchronized time windows, Window0_a, Window0_b, Window0_c, and Window0_d; the plurality of synchronized time windows, Window1_a, Window1_b, Window1_c, and Window1_d; the plurality of synchronized time windows, Window2_a, Window2_b, Window2_c, and Window2_d; and, the plurality of synchronized time windows, Window3_a, Window3_b, Window3_c, and Window3_d, and store the estimated resulting video QoE, $S_{QoE\_total}$, for the human viewer for the total duration of the video content or communications in the QoE data storage 215. The resulting video QoE for the human viewer for the total duration, extending at least from time, 0, to time, 4T (see FIG. 3), of the video content or communications at the video receiver 110 can be expressed, as follows:

$$S_{QoE\_total} = z(S_{QoE\_avg}, S_{QoE\_dev}), \quad (18)$$

in which "$S_{QoE\_avg}$" corresponds to the average of the predefined combinations of QoE scores, "$S_{QoE\_dev}$" corresponds to the standard deviation of the predefined combinations of QoE scores, and "$z(\ldots)$" is a predetermined function of $S_{QoE\_avg}$ and $S_{QoE\_dev}$. In one embodiment, the predetermined function, $z(\ldots)$, can be expressed, as follows:

$$z(\ldots) = S_{QoE\_avg} - K * S_{QoE\_dev}, \quad (19)$$

in which "$\kappa$" is a constant. In one embodiment, the constant, $\kappa$, can be set to 3.0 or any other suitable value.

By providing the media server 106 that can collect, within a plurality of predetermined time windows synchronized in time, at least (1) one or more operational parameters of the ingress and egress networks 104, 108 over which video content or communications can be transmitted to a human viewer, and (2) one or more coding parameters of the video decoder 204 and the video encoder 206 employed by the media server 106, and determine QoE scores associated with some or all the ingress network 104, the video decoder 204, the video encoder 206, and the egress network 108 based at least in part on the collected operational parameters and/or coding parameters, a resulting video QoE for the human viewer at the video receiver 110 can be advantageously estimated by the media server 106 as a predefined combination of the respective QoE scores. In the event the estimated resulting video QoE does not meet a target level of video QoE for a particular video-based service, one or more components (e.g., one or more video servers and/or clients, one or more video decoders and/or encoders) of the ingress network 104, the egress network 108, and/or the media server 106 can be adjusted, modified, and/or replaced in an effort to achieve the target level of video QoE.

Figure 4:
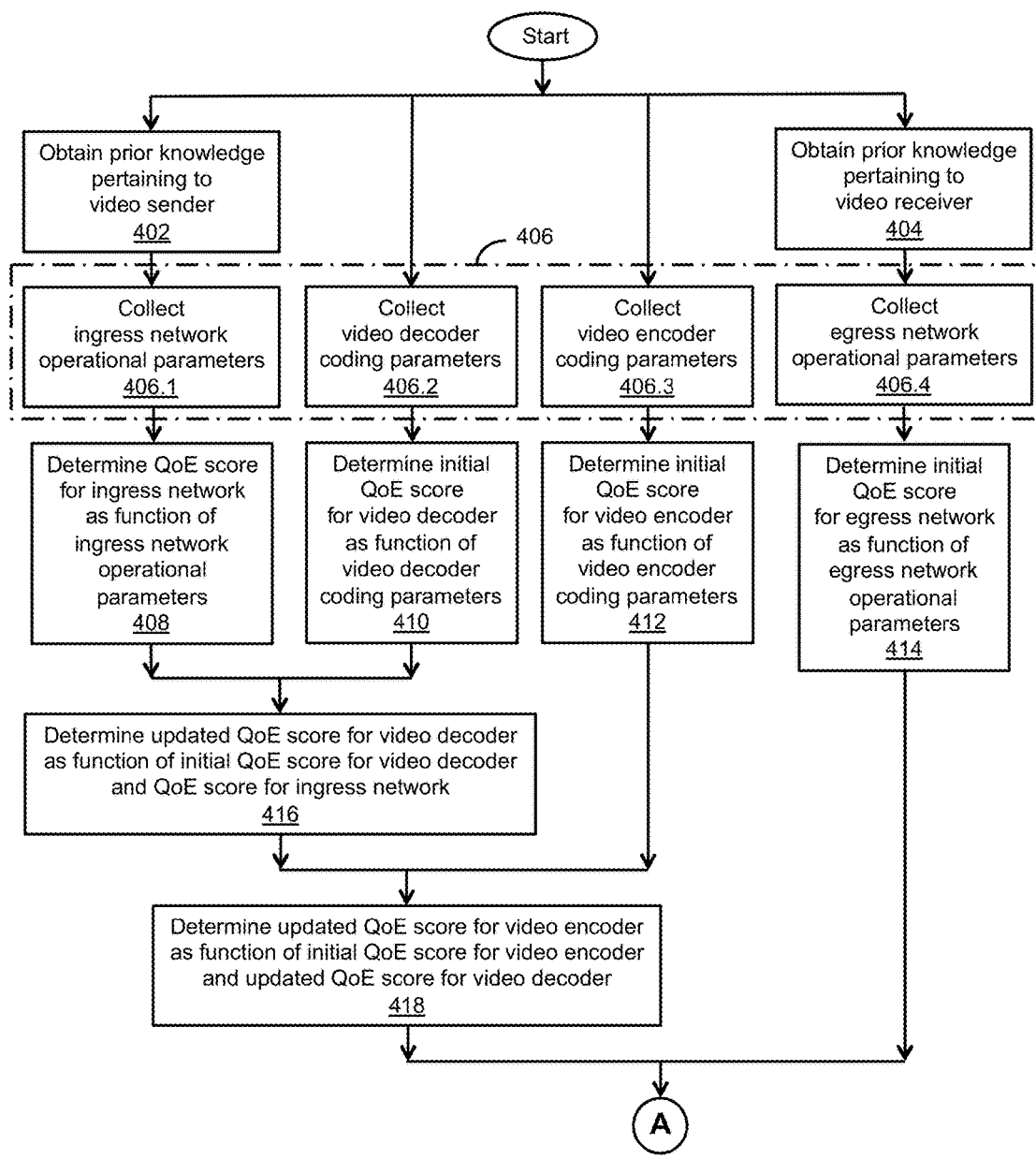
FIG. 4 is a flow diagram of an exemplary method of the media server of FIG. 2 for estimating the video QoE of human viewers of video content or communications at video receivers within the system of FIG. 1.
Figure 4:
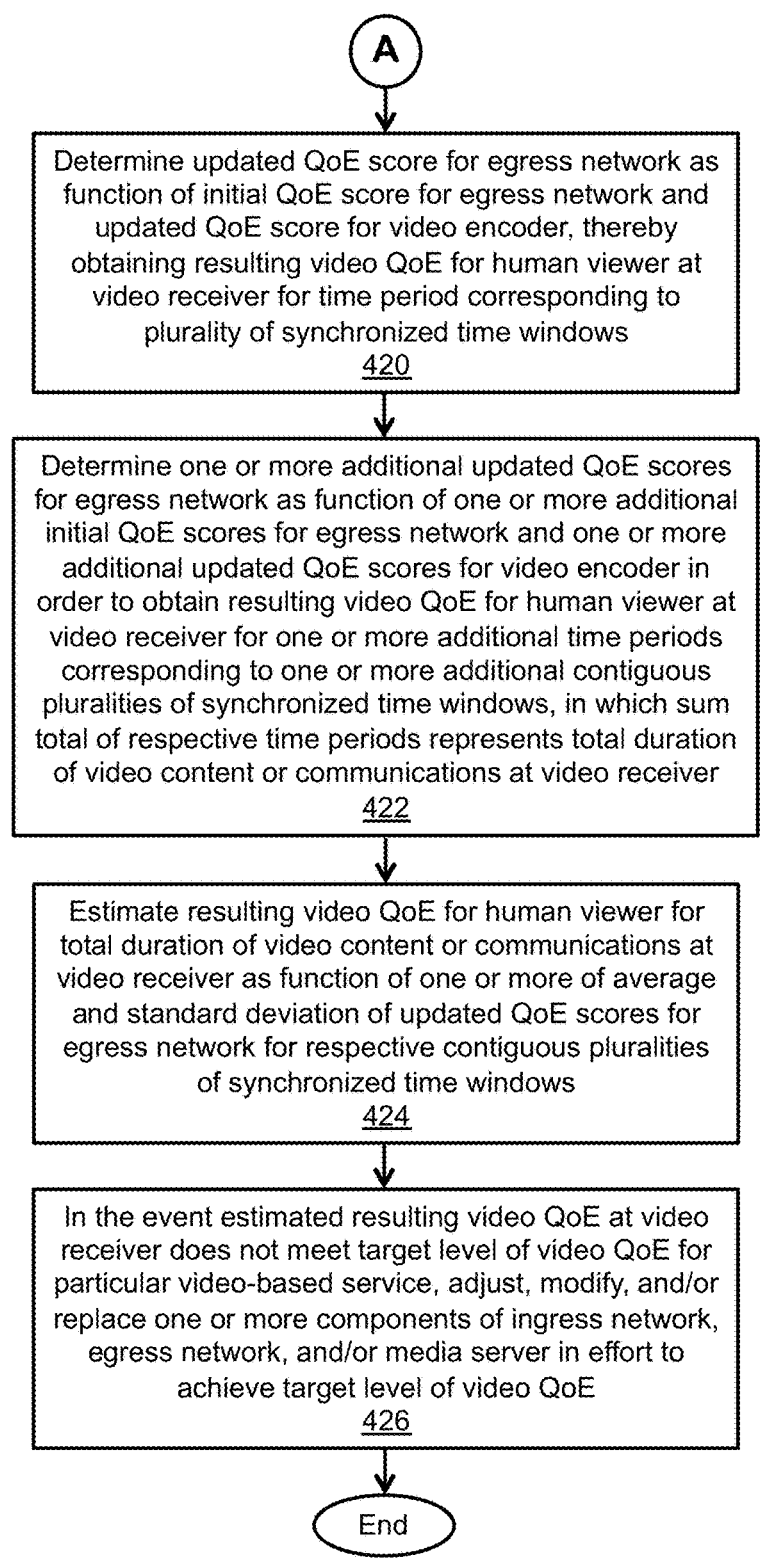

FIG. 4 depicts an exemplary method of the media server 106 (see FIGS. 1 and 2) for estimating the video QoE of a human viewer of video content or communications at the video receiver 110 within the system 100 (see FIG. 1). As depicted in blocks 402 and 404 (see FIG. 4), prior knowledge, if any, pertaining to one or both of the video sender 102 and the video receiver 110 is obtained by the media server 106. For example, such prior knowledge pertaining to the video sender 102 may include certain costs associated with sending specific forms of packet error feedback information over the ingress network 104 to the video sender 102, as well as wait times for handling out-of-order packets and/or receiving retransmissions of lost packets over the ingress network 104 from the video sender 102. Further, such prior knowledge pertaining to the video receiver 110 may include reception quality feedback information received at the media server 106 from the video receiver 110 over the egress network 108, as well as information about multimedia data transmit rates from the media server 106 to the data receiver 110 over the egress network 108.

As depicted in block 406, operational and/or coding parameters associated with some or all of the ingress network 104, the video decoder 204, the video encoder 206, and the egress network 108 are collected, under control of the controller 202, by a plurality of parameter collectors within a plurality of synchronized time windows, respectively. As depicted in sub-block 406.1, one or more ingress network operational parameters are collected by the ingress network operational parameter collector 208. As depicted in sub-block 406.2, one or more video decoder coding parameters are collected by the video decoder coding parameter collector 212. As depicted in sub-block 406.3, one or more video encoder coding parameters are collected by the video encoder coding parameter collector 214. As depicted in sub-block 406.4, one or more egress network operational parameters are collected by the egress network operational parameter collector 210. As depicted in block 408, a QoE score for the ingress network 104 is then determined, by the controller 202, as a function of the collected ingress network operational parameters. As depicted in block 410, an initial QoE score for the video decoder 204 is further determined, by the controller 202, as a function of the collected video decoder coding parameters. As depicted in block 412, an initial QoE score for the video encoder 206 is still further determined, by the controller 202, as a function of the collected video encoder coding parameters. As depicted in block 414, an initial QoE score for the egress network 108 is yet further determined, by the controller 202, as a function of the collected egress network operational parameters.

As depicted in block 416, an updated QoE score for the video decoder 204 is determined, by the controller 202, as a function of the initial QoE score for the video decoder 204 and the QoE score for the ingress network 104. As depicted in block 418, an updated QoE score for the video encoder 206 is further determined, by the controller 202, as a function of the initial QoE score for the video encoder 206 and the updated QoE score for the video decoder 204. As depicted in block 420, an updated QoE score for the egress network 108 is still further determined, by the controller 202, as a function of the initial QoE score for the egress network 108 and the updated QoE score for the video encoder 206, thereby obtaining a resulting video QoE for the human viewer at the video receiver 110 for a time period corresponding to the plurality of synchronized time windows. As depicted in block 422, one or more additional updated QoE scores for the egress network 108 are determined, by the controller 202, as a function of one or more additional initial QoE scores for the egress network 108 and one or more additional updated QoE scores for the video encoder 206 in order to obtain a resulting video QoE for the human viewer at the video receiver 110 for one or more additional time periods corresponding to one or more additional contiguous pluralities of synchronized time windows, in which the sum total of the respective time periods represents the total duration of video content or communications at the video receiver 110. As depicted in block 424, a resulting video QoE for the human viewer for the total duration of video content or communications at the video receiver 110 is estimated, by the controller 202, as a function of one or more of the average and the standard deviation of the updated QoE scores for the egress network 108 for the respective contiguous pluralities of synchronized time windows. As depicted in block 426, in the event the estimated resulting video QoE at the video receiver 110 does not meet a target level of video QoE for a particular video-based service, one or more components (e.g., one or more video servers and/or clients, one or more video decoders and/or encoders) of the ingress network 104, the egress network 108, and/or the media server 106 are adjusted, modified, and/or replaced in effort to achieve the target level of video QoE.

It is noted that the operations herein described are purely exemplary and imply no particular order. Further, the operations can be used in any sequence when appropriate and can be partially used. With the above illustrative embodiments in mind, it should be understood that the above-described systems and methods might employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and/or otherwise manipulated.

Moreover, any of the operations described herein that form part of the above-described systems and methods are useful machine operations. The above-described systems and methods also relate to a device or an apparatus for performing such operations. The apparatus can be specially constructed for the required purpose, or the apparatus can be a general-purpose computer selectively activated or configured by a software program stored in the computer. In particular, various general-purpose machines employing one or more processors coupled to one or more computer readable media can be used with software programs written in accordance with the teachings herein, or it may be more convenient to construct a more specialized apparatus to perform the required operations.

The above-described systems and methods can also be embodied as computer readable code on a computer readable medium. The computer readable medium is any data storage device that can store data, which can be thereafter be read by a computer system. Examples of such computer readable media include hard drives, read-only memory (ROM), random-access memory (RAM), CD-ROMs, CD-Rs, CD-RWs, magnetic tapes, and other optical and non-optical data storage devices. The computer readable media can also be distributed over a network-coupled computer system so that the computer readable code is stored and executed in a distributed fashion.

It will be appreciated by those of ordinary skill in the art that modifications to and variations of the above-described systems and methods may be made without departing from the inventive concepts disclosed herein. Accordingly, the invention should not be viewed as limited except as by the scope and spirit of the appended claims.

What is claimed is:

1. A method of a media server for estimating a video quality of experience (QoE) of a human viewer of video content or communications at a video receiver, comprising:
   obtaining, by a media server within a first one or more of a plurality of predetermined synchronized time windows, operational parameters of associated with one or more of an ingress network and an egress network over which video content or communications is transmittable, the media server being communicably coupleable to a video sender over the ingress network and communicably coupleable to a video receiver over the egress network, the media server including a video decoder and a video encoder;
   obtaining, by the media server within a second one or more of the plurality of predetermined synchronized time windows, coding parameters associated with one or more of the video decoder and the video encoder;
   having obtained the operational parameters and the coding parameters:
      determining, by the media server, one or more first QoE scores for one or more of the ingress network and the egress network as a function of the operational parameters associated therewith; and
      determining, by the media server, one or more second QoE scores for one or more of the video decoder and the video encoder as a function of the coding parameters associated therewith; and
   estimating, for a time period of the plurality of predetermined synchronized time windows, a resulting video QoE for a human viewer of the video content or communications at the video receiver as a predefined combination of the respective first and second QoE scores.

2. The method of claim 1 further comprising:
   in the event the estimated resulting video QoE for the human viewer of the video content or communications at the video receiver fails to meet a target level of video QoE, performing one or more of adjusting, modifying, and replacing one or more components of one or more of the ingress network, the video decoder, the video encoder, and the egress network in an effort to obtain the target level of video QoE.

3. The method of claim 1 further comprising:
   obtaining, by the media server, prior knowledge pertaining to the video sender, the prior knowledge including one or more of costs associated with sending specific forms of packet error feedback information over the ingress network to the video sender, and wait times for one or more of handling out-of-order packets and receiving retransmissions of lost packets over the ingress network from the video sender,
   wherein the determining of the one or more first QoE scores for one or more of the ingress network and the egress network includes determining the one or more first QoE scores for the ingress network based at least on one or more of the operational parameters and the prior knowledge pertaining to the video sender.

4. The method of claim 1 further comprising:
   obtaining, by the media server, prior knowledge pertaining to the video receiver, the prior knowledge including one or more of reception quality feedback information receivable at the media server from the video receiver over the egress network, and information pertaining to multimedia data transmit rates from the media server to the data receiver over the egress network,
   wherein the determining of the one or more first QoE scores for one or more of the ingress network and the egress network includes determining the one or more first QoE scores for the egress network based at least on one or more of the operational parameters and the prior knowledge pertaining to the video receiver.

5. The method of claim 1 wherein the one or more first QoE scores includes a QoE score for the ingress network, wherein the one or more second QoE scores includes an initial QoE score for the video decoder, and wherein the determining of the one or more second QoE scores for one or more of the video decoder and the video encoder includes determining an updated QoE score for the video decoder as a function of the initial QoE score for the video decoder and the QoE score for the ingress network.

6. The method of claim 5 wherein the one or more second QoE scores includes an initial QoE score for the video encoder, and wherein the determining of the one or more second QoE scores for one or more of the video decoder and the video encoder includes determining an updated QoE score for the video encoder as a function of the initial QoE score for the video encoder and the updated QoE score for the video decoder.

7. The method of claim 6 wherein the one or more first QoE scores includes an initial QoE score for the egress network, and wherein the determining of the one or more first QoE scores for one or more of the ingress network and the egress network includes determining an updated QoE score for the egress network as a function of the initial QoE score for the egress network and the updated QoE score for the video encoder.

8. The method of claim 7 wherein the estimating of the resulting video QoE for the human viewer of the video content or communications at the video receiver includes estimating the resulting video QoE as the predefined combination of the respective first and second QoE scores corresponding to the updated QoE score for the egress network.

9. The method of claim 1 further comprising:
   obtaining, by the media server within a first one or more of a second plurality of predetermined synchronized time windows, second operational parameters of one or more of the ingress network and the egress network;
   obtaining, by the media server within a second one or more of the second plurality of predetermined synchronized time windows, second coding parameters of one or more of the video decoder and the video encoder;
   having obtained the second operational parameters and the second coding parameters, determining, by the media server, one or more third QoE scores for one or more of the ingress network and the egress network based at least on the second operational parameters, and one or more fourth QoE scores for one or more of the video decoder and the video encoder based at least on the second coding parameters; and estimating, for a second time period of the second plurality of predetermined synchronized time windows, a second resulting video QoE for the human viewer of the video content or communications at the video receiver as a predefined combination of the respective third and fourth QoE scores.

10. The method of claim 9 wherein a sum of at least the first time period and the second time period represents a duration of the video content or communications at the video receiver, and wherein the method further comprises:

estimating, for the duration of the video content or communications at the video receiver, the resulting video QoE for the human viewer of the video content or communications as a function of one or more of an average and a standard deviation of at least (1) the predefined combination of the respective first and second QoE scores, and (2) the predefined combination of the respective third and fourth QoE scores.

11. A media server for estimating a video quality of experience (QoE) of a human viewer of video content or communications at a video receiver, comprising:

a video decoder;
a video encoder; and
a controller operative:
to control, within a first one or more of a plurality of predetermined synchronized time windows, an acquisition of operational parameters associated with one or more of an ingress network and an egress network over which video content or communications is transmittable, the media server being communicably coupleable to a video sender over the ingress network and communicably coupleable to a video receiver over the egress network;
to control, within a second one or more of the plurality of predetermined synchronized time windows, an acquisition of coding parameters associated with one or more of the video decoder and the video encoder;
having controlled acquisitions of the operational parameters and the coding parameters, to determine one or more first QoE scores for one or more of the ingress network and the egress network as a function of the operational parameters associated therewith, and one or more second QoE scores for one or more of the video decoder and the video encoder as a function of the coding parameters associated therewith; and
to estimate, for a time period of the plurality of predetermined synchronized time windows, a resulting video QoE for a human viewer of the video content or communications at the video receiver as a predefined combination of the respective first and second QoE scores.

12. The media server of claim 11 wherein the controller is further operative:

to control an acquisition of prior knowledge pertaining to the video sender, the prior knowledge including one or more of costs associated with sending specific forms of packet error feedback information over the ingress network to the video sender, and wait times for one or more of handling out-of-order packets and receiving retransmissions of lost packets over the ingress network from the video sender; and to determine the one or more first QoE scores for the ingress network based at least on one or more of the operational parameters and the prior knowledge pertaining to the video sender.

13. The media server of claim 11 wherein the controller is further operative:

to control an acquisition of prior knowledge pertaining to the video receiver, the prior knowledge including one or more of reception quality feedback information receivable at the media server from the video receiver over the egress network, and information pertaining to multimedia data transmit rates from the media server to the data receiver over the egress network; and to determine the one or more first QoE scores for the egress network based at least on one or more of the operational parameters and the prior knowledge pertaining to the video receiver.

14. The media server of claim 11 wherein the one or more first QoE scores includes a QoE score for the ingress network, wherein the one or more second QoE scores includes an initial QoE score for the video decoder, and wherein the controller is further operative to determine an updated QoE score for the video decoder as a function of the initial QoE score for the video decoder and the QoE score for the ingress network.

15. The media server of claim 14 wherein the one or more second QoE scores includes an initial QoE score for the video encoder, and wherein the controller is further operative to determine an updated QoE score for the video encoder as a function of the initial QoE score for the video encoder and the updated QoE score for the video decoder.

16. The media server of claim 15 wherein the one or more first QoE scores includes an initial QoE score for the egress network, and wherein the controller is further operative to determine an updated QoE score for the egress network as a function of the initial QoE score for the egress network and the updated QoE score for the video encoder.

17. The media server of claim 16 wherein the controller is further operative to estimate the resulting video QoE as the predefined combination of the respective first and second QoE scores corresponding to the updated QoE score for the egress network.

18. The media server of claim 11 wherein the controller is further operative:

to control, within a first one or more of a second plurality of predetermined synchronized time windows, an acquisition of second operational parameters of one or more of the ingress network and the egress network;

to control, within a second one or more of the second plurality of predetermined synchronized time windows, an acquisition of second coding parameters of one or more of the video decoder and the video encoder;

having controlled acquisitions of the second operational parameters and the second coding parameters, to determine one or more third QoE scores for one or more of the ingress network and the egress network based at least on the second operational parameters, and one or more fourth QoE scores for one or more of the video decoder and the video encoder based at least on the second coding parameters; and to estimate, for a second time period of the second plurality of predetermined synchronized time windows, a second resulting video QoE for the human viewer of the video content or communications at the video receiver as a predefined combination of the respective third and fourth QoE scores.

19. The media server of claim 18 wherein a sum of at least the first time period and the second time period represents a duration of the video content or communications at the video receiver, and wherein the controller is further operative to estimate, for the duration of the video content or communications at the video receiver, the resulting video QoE for the human viewer of the video content or communications as a function of one or more of an average and a standard deviation of at least (1) the predefined combination of the respective first and second QoE scores, and (2) the predefined combination of the respective third and fourth QoE scores.

20. A media server, wherein the media server is communicably coupleable to a video sender over an ingress network and communicably coupleable to a video receiver over an egress network, and wherein video content or communications is transmittable to a human viewer over the ingress network and the egress network, the media server comprising:
- a controller;
- a video decoder;
- a video encoder; and
- a plurality of parameter collectors including an ingress network operational parameter collector, an egress network operational parameter collector, a video decoder coding parameter collector, and a video encoder coding parameter collector, wherein the ingress network operational parameter collector is operative, under control of the controller and within a first one of a plurality of predetermined synchronized time windows, to acquire operational parameters associated with the ingress network, wherein the egress network operational parameter collector is operative, under control of the controller and within a second one of the plurality of predetermined synchronized time windows, to acquire operational parameters associated with the egress network, wherein the video decoder coding parameter collector is operative, under control of the controller and within a third one of the plurality of predetermined synchronized time windows, to acquire coding parameters associated with the video decoder, wherein the video encoder coding parameter collector is operative, under control of the controller and within a fourth one of the plurality of predetermined synchronized time windows, to acquire coding parameters associated with the video encoder, and wherein the controller is operative:
- to determine a first QoE score for the ingress network as a function of the operational parameters of the ingress network,
- to determine a second QoE score for the egress network as a function of the operational parameters associated with the egress network,
- to determine a third QoE score for the video decoder as a function of the coding parameters associated with the video decoder,
- to determine a fourth QoE score for the video encoder as a function of the coding parameters associated with the video encoder, and
- to estimate, for a time period of the plurality of predetermined synchronized time windows, a resulting video QoE for the human viewer of the video content or communications at the video receiver as a predefined combination of the respective first, second, third, and fourth QoE scores.

21. The method of claim 1 further comprising:
determining, by the media server, one or more of a temporal quality score, a spatial quality score, and a quantization quality score for one or more of the video decoder and the video encoder as a function of at least some of the coding parameters associated with one or more of the video decoder and the video encoder.

22. The method of claim 21 wherein the determining of the one or more second QoE scores for one or more of the video decoder and the video encoder includes determining the one or more second QoE scores as a function of one or more of the temporal quality score, the spatial quality score, and the quantization quality score determined for the one or more of the video decoder and the video encoder.

23. The method of claim 1 wherein the estimating of the resulting video QoE for the human viewer includes forming the predefined combination of (i) the one or more first QoE scores for the one or more of the ingress network and the egress network, and (ii) the one or more second QoE scores for the one or more of the video decoder and the video encoder.

* * * * *